June 23, 1936.  J. WALDES  2,045,504
SLIDE OPERATED FASTENER
Filed Jan. 24, 1936
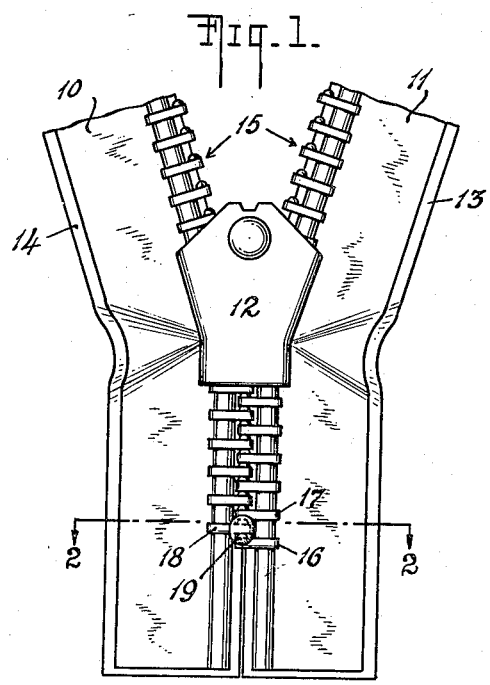
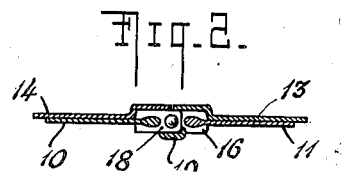
WITNESS
G. V. Rasmussen
INVENTOR
JINDRICH WALDES
BY
ATTORNEYS Patented June 23, 1936

2,045,504

UNITED STATES PATENT OFFICE 2,045,504

SLIDE OPERATED FASTENER

Jindřich Waldes, Prague, Czechoslovakia

Application January 24, 1936, Serial No. 60,621
In Germany June 11, 1934

4 Claims. (Cl. 24—205)

This invention relates to separable fasteners of the slide operated type and the object of the invention is to improve such separable fasteners, particularly with respect to providing more reliable means than have thus far been used for limiting the movement of the slider at the end of its travel when operated to open the fastener structure.

Slide operated fastener structures generally comprise a pair of flexible stringers or supporting tapes on the opposite reenforced edges of which are anchored cooperating rows of fastener elements, the fastener elements of each row being disposed in staggered relation with the elements of the other row and each having an attaching portion for securing it to the stringer and an interlocking portion provided with a projection extending from one face thereof and a corresponding indentation located rearwardly of the projection in the opposite face to interlock with projections and recesses on the elements of the other stringer. In some constructions, the fastener elements are covered by elastic material, or concealed by fabric strips integral with, or separate from the supporting tapes and secured to the elements by any suitable means, such as stitches. In all such structures the two stringers, or supporting tapes, on which the elements are supported, are usually permanently united at one end by means of locking members which, in addition to functioning as a permanent binder and stop for the slider at the end of its travel, serves also to locate the fastener elements on one stringer relative to the fastener elements on the other stringer so that they will come into engagement properly. Heretofore, the locking members used were in the form of hooks or clips which bridged the tapes below the last interlocking elements in the rows and were either stitched to the tapes or provided with prongs, which were clinched against the tapes and penetrated the fabric material thereof. These methods of uniting the tapes have not proved entirely satisfactory because of the insufficient holding power of the hooks or clips against impacts of the slider when the latter is either carelessly or over-vigorously drawn to open the fastener structure. In the case where threads are used for securing the locking members, the wear and tear loosens the threads and sometimes breaks them. In the case where clips are used, the prongs thereof tend to cut the fabric material of the tapes so that the locking members in time become loosened and if the fastener structure is used in connection with articles where they are subjected to a vigorous usage, the clips may bend or break. Furthermore, when the locking members become loosened, it sometimes happens that they cannot function to bring the elements into proper engagement so that the slider becomes jammed and cannot operate to close the fastener structure. These prior locking constructions have the disadvantage also that they were either entirely or in part on the surface of the supporting tapes so that in spite of their small dimensions they spoiled the appearance of the fastener as a whole, even in those cases in which the elements of the fastener structure were covered by fabric strips.

It is the purpose of the present invention to eliminate the above mentioned disadvantages, the essential feature of the invention being that the stop and tape-uniting means is formed by soldering together several of the elements in interlocked position at the end of the fastener structure.

The invention is illustrated in the accompanying drawing in which Fig. 1 is a bottom plan view of a fastener structure embodying my stop and Fig. 2 is a section taken along the line 2—2 of Fig. 1.

The fastener structure illustrated comprises a pair of flexible supporting strips, or stringers 10 and 11, having cooperating rows of fastener elements 15 attached in closely spaced relation to the reenforced edges of the stringer. The elements of each stringer are arranged in staggered relation to the elements on the other stringer and are adapted to be interlocked with or disengaged from the elements on the other stringer by a manually operated slider 12, movable lengthwise longitudinally of the rows of elements. The construction of the elements and the manner of engagement of the parts by the slider is similar to other fastener structures of this type and will be clearly apparent from an inspection of Figs. 1 and 2. The fastener structure may be provided with covering strips 13 and 14 for concealing the fastener elements on the stringers 11 and 10, respectively, when the fastener structure has been closed by the slider.

In accordance with my invention, the two stringers 10 and 11 are permanently united together and a stop provided for the slider 12 by gether and a stop provided for the slider 12 by first placing the last interlocking element 18 of one row of the interlocking elements in interlocked relation between the last two elements 16 and 17 of the other row and then permanently uniting the three elements 16, 17 and 18 in their locked condition by applying molten metallic material on such elements, so that a portion of the metallic material will cover an outer side of the interlocking portion of the element 18 and portions of which will enter into the spaces formed between the side faces of the interlocking portions of the elements 16 and 18 and 17 and 18. The metallic material 19 should be applied on the underside of the fastener structure so that it will not be visible to the user when the fastener structure is secured to the edges of an opening in an article or interfere with the proper seating of the covering strips 13 and 14 on the upper surfaces of the interlocking portions of the rows of elements. I have found that ordinary soldering material is best suited for the purposes of the invention because it can be applied readily at low temperatures and although it is inherently weak structurally, when united with the elements in accordance with the invention, forms a union of these elements which is sufficiently strong to withstand the most vigorous usage to which the fastener structure will be subjected.

It will be observed that by soldering the last elements in each row of the interlocking elements in the manner above described, I am enabled to accomplish the desirable object of supplying a slide fastener structure provided with a reliable tape-uniting means and slider stop without the necessity of employing a special locking member. The interlocking elements comprising the stop are clamped securely in place about the reenforced edges of the tape and therefore will not loosen or tear the fabric material of the tapes as was heretofore the case with locking members which were sewed on or clinched to the stringers by prongs. Due to the fact that the elements forming the stop are properly associated with the remaining elements in the rows, they will always function to bring the unlocked elements into proper alignment when the slider is operated to close the fastener structure, thereby practically eliminating the danger of the slider becoming jammed at the united end of the fastener structure. Furthermore, there are no disturbing or unsightly elements on the outside of the locking zone of the fastener structure, thereby enhancing the appearance of the slide fastener and rendering it possible to provide a uniformly appearing covering strip throughout the length of the slider.

I claim:

1. A fastener structure of the slide operated type comprising a pair of flexible supporting strips, a row of fastener elements on each strip adapted to interlock in interfingered relation with the row of fastener elements on the other strip, a slider adapted upon sliding movement thereof to effect closing and opening of the fastener structure and a stop permanently securing said supporting strips together at one end of the fastener structure and including at least two elements of one row of the interlocking elements and at least that element of the other row which is disposed intermediate the two elements of the opposite row in the interlocked position of such elements, said elements being interlocked in their effective locked position and soldering material permanently uniting said elements together in their effective locked position.

2. A fastener structure of the slide operated type comprising a pair of flexible supporting strips, a row of fastener elements on each strip adapted to interlock in interfingered relation with the row of fastener elements on the other strip, a slider adapted upon sliding movement thereof to effect closing and opening of the fastener structure and a stop permanently securing said supporting strips together at one end of the fastener structure and including at least two elements of one row of the interlocking elements and at least that element of the other row which is disposed intermediate the two elements of the opposite row in the interlocked position of such elements, said elements being interlocked in their effective locked position and metallic material disposed on a side surface of each of said interlocking elements and in the spaces between the interlocking portions thereof and permanently uniting said elements together in their effective locked position.

3. A fastener structure of the slide operated type comprising a pair of flexible supporting strips, a row of fastener elements on each strip adapted to interlock in interfingered relation with the row of fastener elements on the other strip, a slider adapted upon sliding movement thereof to effect closing and opening of the fastener structure and a stop permanently securing said supporting strips together at one end of the fastener structure and including at least two elements of one row of the interlocking elements and at least that element of the other row which is disposed intermediate the two elements of the opposite row in the interlocked position of such elements, said elements being interlocked in their effective locked position and soldering material permanently uniting said elements together in their effective locked position, portions of said soldering material being disposed in the spaces between the interlocking portions of the elements and uniting the opposing surfaces thereof together and integral with a portion of soldering material disposed on the side surfaces of the united elements.

4. A fastener structure of the slide operated type comprising a pair of flexible supporting strips, a row of fastener elements on each strip adapted to interlock in interfingered relation with the row of fastener elements on the other strip, a slider adapted upon sliding movement thereof to effect closing and opening of the fastener structure and a stop permanently securing said supporting strips together at one end of the fastener structure and including at least one element of one row of the interlocking elements and at least one element of the other row, said elements being maintained in locked position with relation to each other by soldering material having a tenacious bond with the material of which the elements are constituted, so that the united stop elements will resist separation as the result of the impact of the slider and of the deflection of the row of elements on opening.

JINDŘICH WALDES.